(12) United States Patent
Strode (10) Patent No.: US 10,579,331 B2
(45) Date of Patent: Mar. 3, 2020

(54) METHOD AND APPARATUS FOR CONTROLLING AN AVERAGE FILL LEVEL OF AN ASYNCHRONOUS FIRST-IN-FIRST-OUT, FIFO

(71) Applicant: ADVA Optical Networking SE, Meiningen (DE)

(72) Inventor: Stephen Strode, Tucker, GA (US)

(73) Assignee: ADVA OPTICAL NETWORKING SE, Meiningen ot Dreissigacker (DE)

( * ) Notice: Subject to any disclaimer, the term of this patent is extended or adjusted under 35 U.S.C. 154(b) by 26 days.

(21) Appl. No.: 15/632,185

(22) Filed: Jun. 23, 2017

(65) Prior Publication Data

US 2018/0373495 A1    Dec. 27, 2018

(51) Int. Cl.
| | |
|---|---|
| G06F 5/14 | (2006.01) |
| G06F 1/08 | (2006.01) |
| H04L 7/00 | (2006.01) |
| G06F 5/12 | (2006.01) |

(52) U.S. Cl.
CPC .............. G06F 5/14 (2013.01); G06F 1/08 (2013.01); G06F 5/12 (2013.01); H04L 7/005 (2013.01); *G06F 2205/126* (2013.01)

(58) Field of Classification Search
CPC ..................................... G06F 5/06; G06F 5/14
See application file for complete search history.

(56) References Cited

U.S. PATENT DOCUMENTS

| | | | |
|---|---|---|---|
| 5,835,543 A | 11/1998 | Mazzurco et al. | |
| 7,366,270 B2 | 4/2008 | Tang et al. | |
| 7,646,836 B1 | 1/2010 | Mays | |
| 2002/0109617 A1* | 8/2002 | Freidhof | H03H 17/0288 341/61 |
| 2005/0220240 A1 | 10/2005 | Lesso | |
| 2006/0290770 A1* | 12/2006 | LeBlanc | B41J 2/37 347/188 |
| 2008/0117911 A1* | 5/2008 | Rajakarunanayake | H04L 47/10 370/392 |
| 2009/0310729 A1* | 12/2009 | Liu | G06F 5/06 375/376 |
| 2013/0148768 A1 | 6/2013 | Kim | |
| 2015/0205579 A1 | 7/2015 | Mendel et al. | |
| 2016/0259391 A1* | 9/2016 | Tidwell | G06F 1/324 |
| 2018/0167056 A1* | 6/2018 | Bauernfeind | H03H 17/0018 |

FOREIGN PATENT DOCUMENTS

| | | |
|---|---|---|
| DE | 101 39 882 C2 | 7/2003 |
| EP | 2 355 387 A1 | 8/2011 |

OTHER PUBLICATIONS

Extended European Search Report for Application No. 18154100.4 dated Oct. 4, 2018.

* cited by examiner

*Primary Examiner* — Idriss N Alrobaye
(74) *Attorney, Agent, or Firm* — Jenkins, Wilson, Taylor & Hunt, P.A.

(57) ABSTRACT

A fill level control apparatus configured to control the average fill level of an asynchronous first-in-first-out, FIFO, the fill level control apparatus comprising an offset calculation unit adapted to or configured to calculate the offset between a programmable target average fill level and the current average fill level of the FIFO and an adjustment unit adapted to or configured to adjust continuously the empty rate of the FIFO in response to the calculated offset to keep the average fill level of the FIFO constant.

13 Claims, 4 Drawing Sheets

METHOD AND APPARATUS FOR CONTROLLING AN AVERAGE FILL LEVEL OF AN ASYNCHRONOUS FIRST-IN-FIRST-OUT, FIFO

TECHNICAL FIELD

The disclosure herein relates to a method and apparatus for controlling an average fill level of an asynchronous first-in-first-out, FIFO.

BACKGROUND

In a data communications digital design, a data stream can be passed from one clock domain to another clock domain through an asynchronous FIFO. While the average fill rate and empty rate of the FIFO are equal, the two clock signals driving the fill and empty rate are generally asynchronous and do not necessarily have the same frequency. The two clock signals are generally driven by separate clock generating signal sources. The clock signals can be related to each other by a multiplying factor which can comprise a fractional number. While the average fill rate and empty rate of the FIFO is equal, the FIFO fill level of the FIFO at any instant can vary up and down. For example, an instantaneous fill rate of the FIFO can be bursty. That is, the fill rate of the FIFO can exceed the empty rate of the FIFO for a period of time and then becomes slower than the empty rate for a period of time. However, for the FIFO to operate properly, the average fill rate of the FIFO shall be equal to the average empty rate of the FIFO. Consequently, there is a center operating point of the FIFO, i.e. the average fill level of the FIFO. Since the two clock generating sources of the two clock domains act independently, the center operating point of the FIFO is indeterminate. In the case where one or both of the clock generating sources is a phase-locked loop PLL, their locking acquisition algorithms are independent and consequently, the center operating point of the FIFO is indeterminate. The indeterminate nature of the center operating point of a FIFO can cause an overall latency of the design to vary and thus not be constant. This can form an important issue for instance for meeting PTP (precision time protocol) and synchronous Ethernet specifications.

Accordingly, there is a need to ensure that the average fill level of an asynchronous first-in-first-out, FIFO, remains constant and can be set.

SUMMARY

The disclosure herein provides according to a first aspect a fill level control apparatus configured to control the average fill level of an asynchronous first-in-first-out, FIFO, the fill level control apparatus comprising: an offset calculation unit adapted to or configured to calculate the offset between a programmable target average fill level and the current average fill level of the FIFO; and an adjustment unit adapted to or configured to adjust continuously the empty rate of the FIFO in response to the calculated offset to keep the average fill level of the FIFO constant.

In a possible embodiment of the fill level control apparatus according to the first aspect of the present disclosure, the offset calculation unit comprises a programmable target center operating point register adapted to or configured to store the target average fill level of the FIFO.

In a further possible embodiment of the fill level control apparatus according to the first aspect of the present disclosure, the offset calculation unit further comprises a fill level averaging circuit adapted to or configured to compute the current average fill level on the basis of monitored fill levels of the FIFO.

In a still further possible embodiment of the fill level control apparatus according to the first aspect of the present disclosure, the offset calculation unit further comprises a subtractor adapted to or configured to subtract the computed current average fill level from the stored target average fill level to calculate the offset between the target average fill level and the current average fill level of the FIFO.

In a still further possible embodiment of the fill level control apparatus according to the first aspect of the present disclosure, the adjustment unit comprises a variable divider controller adapted to or configured to determine a number of divide change pulses required to compensate the offset calculated by the offset calculation unit and to generate a corresponding number of divide change pulses applied to a variable clock divider of the adjustment unit.

In a further possible embodiment of the fill level control apparatus according to the first aspect of the present disclosure, the variable clock divider of the adjustment unit is adapted to or configured to divide a received empty rate reference clock depending on the divide change pulses received from the variable divider controller of the adjustment unit to adjust continuously the empty rate clock driving the empty rate of the FIFO.

In a still further possible embodiment of the fill level control apparatus according to the first aspect of the present disclosure, the variable divider controller of the adjustment unit is adapted to or configured to pass an offset sign of the offset calculated by the offset calculation unit to the variable clock divider of the adjustment unit.

In a further possible embodiment of the fill level control apparatus according to the first aspect of the present disclosure, the variable clock divider receiving the offset sign of the offset from the variable divider controller is adapted to or configured to divide the received empty rate reference clock depending on the received offset sign and depending on a number of divide change pulses received from the variable divider controller.

In a still further possible embodiment of the fill level control apparatus according to the first aspect of the present disclosure, the variable clock divider of the adjustment unit is adapted to or configured to divide the received empty rate reference clock by a nominal divide value n in the absence of any divide change pulse and is further adapted to or configured to divide the received empty rate reference clock by n+m one time upon reception of each divide change pulse if the received offset sign is positive and is further adapted to or configured to divide the received empty rate reference clock by n−m one time upon reception of each divide change pulse if the received offset sign is negative.

In a further possible embodiment of the fill level control apparatus according to the first aspect of the present disclosure, the empty rate reference clock divided by the variable clock divider of the adjustment unit is supplied as a reference clock to a phase-locked loop, PLL, circuit providing a PLL output clock adapted to or configured to control the empty rate clock driving the empty rate of the FIFO.

In a further possible embodiment of the fill level control apparatus according to the first aspect of the present disclosure, the empty rate of the FIFO is equivalent to an empty rate clock frequency of an empty rate clock multiplied with a read enable duty cycle.

In a still further possible embodiment of the fill level control apparatus according to the first aspect of the present disclosure, the FIFO controlled by the fill level control apparatus comprises a fill level output indicating instantaneous fill levels of the FIFO connected to the fill level averaging circuit of the offset calculation unit of the fill level control apparatus.

In a still further possible embodiment of the fill level control apparatus according to the first aspect of the present disclosure, the fill level averaging circuit of the offset calculation unit is adapted to or configured to monitor the fill levels indicated by the FIFO through a number of FIFO cycles to record minimum and maximum FIFO fill levels and to compute the current average fill level of the FIFO depending on the recorded minimum and maximum FIFO fill levels.

In a still further possible embodiment of the fill level control apparatus according to the first aspect of the present disclosure, the target center operating point register of the offset calculation unit is programmed by a microprocessor through an interface of the fill level control apparatus.

In a still further possible embodiment of the fill level control apparatus according to the first aspect of the present disclosure, the variable divider controller of the adjustment unit is adapted to or configured to pause for a predetermined period of time once the number of divide change pulses has been supplied to the variable clock divider of the adjustment unit.

The disclosure herein further provides according to a second aspect a method for controlling an average fill level of an asynchronous first-in-first-out, FIFO, comprising the steps of:

calculating an offset between a target average fill level and the current average fill level of the FIFO; and adjusting continuously the empty rate of the FIFO in response to the calculated offset to keep the average fill level of the FIFO constant.

In a possible embodiment of the method according to the second aspect of the present disclosure, instantaneous fill levels of the FIFO are monitored to determine the current average fill level of the FIFO.

BRIEF DESCRIPTION OF THE DRAWINGS

In the following, possible example embodiments of the different aspects of the present disclosure are described in more detail with reference to the enclosed figures.

DETAILED DESCRIPTION

Figure 1:
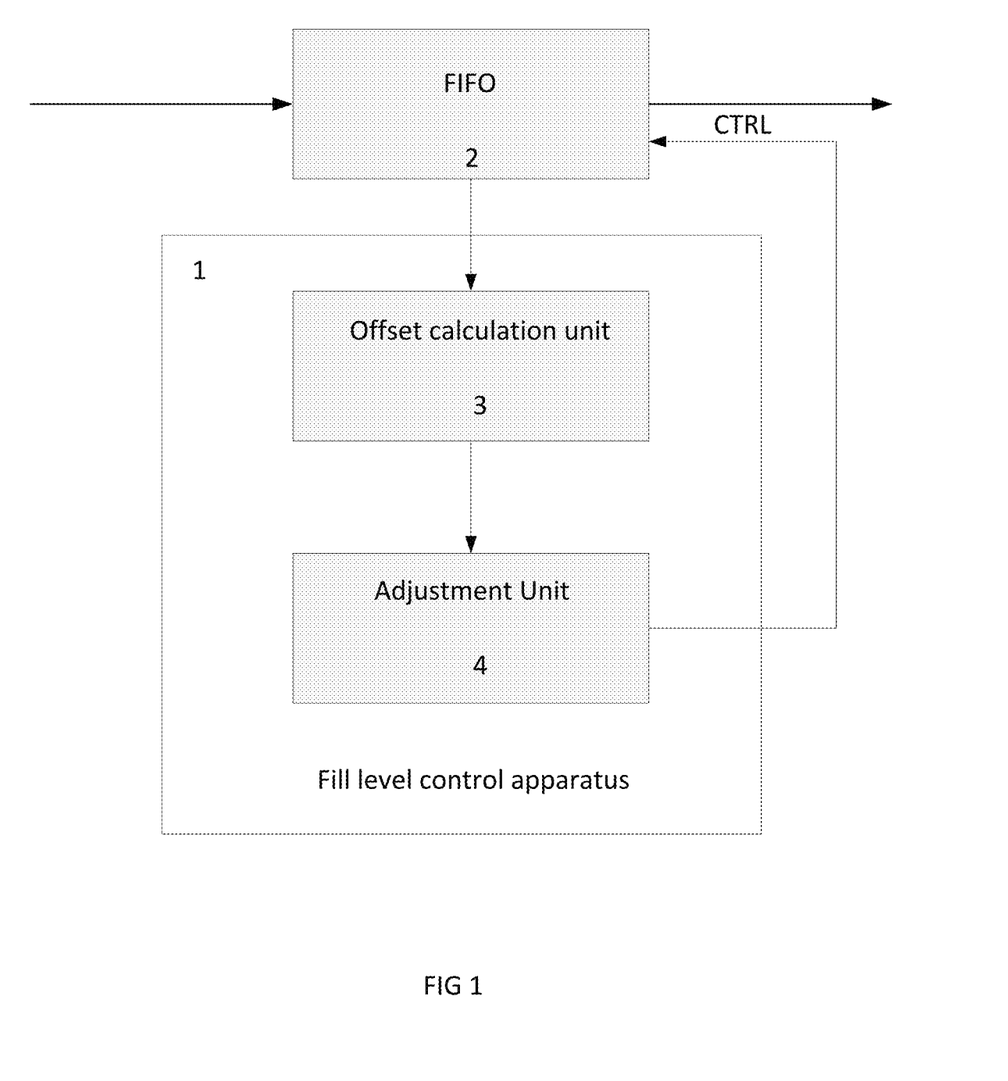
FIG. 1 shows a block diagram of a possible exemplary embodiment of a fill level control apparatus according to the first aspect of the present disclosure.

FIG. 1 shows a block diagram of a possible exemplary embodiment of a fill level control apparatus 1 according to the first aspect of the present disclosure. The fill level control apparatus 1 is connected in the illustrated embodiment of FIG. 1 to an asynchronous first-in-first-out, FIFO, 2 as shown in FIG. 1.

In the illustrated embodiment of FIG. 1, the fill level control apparatus 1 comprises two main components, i.e. an offset calculation unit 3 and an adjustment unit 4. The offset calculation unit 3 of the fill level control apparatus 1 is adapted to or configured to calculate the offset between a programmable target average fill level and the current average fill level of the FIFO 2. The adjustment unit 4 of the fill level control apparatus 1 is adapted to or configured to adjust continuously the empty rate of the FIFO in response to the calculated offset to keep the average fill level of the FIFO 2 constant.

The fill level control apparatus 1 does ensure hitlessly that the FIFO's average fill level, i.e. the center operating point remains constant. The term hitlessly implies that the FIFO's average fill level is controlled by the fill level control apparatus 1 without losing any data or taking any data errors. The purpose of having the FIFO's average fill level controlled is to ensure that the data stream latency through the entire design of a circuit does not vary as a result of a FIFO's average fill level being indeterminate and thus is different each time data traffic through the circuit design is provisioned. If the average fill level of the FIFO 2 is larger than desired, the latency is increased. In contrast, if the average fill level of the FIFO 2 is smaller than desired, the latency is decreased. Accordingly, the fill level control apparatus 1 is configured to control the average fill level of the asynchronous first-in-first-out FIFO 2 shown in FIG. 1 and to keep the average fill level of the FIFO 2 constant. Another purpose for having the FIFO's average fill level controlled is to ensure that jitter or wander on either of the clock sources, i.e. FIFO read clock or FIFO write clock, does not cause the FIFO 2 to underrun or to overrun thus taking data errors. The fill level control apparatus 1 according to the first aspect of the present disclosure is adapted to or configured to continuously monitor the FIFO's average fill level and thus hitlessly adjust it back to a desired average fill level (if needed) wherein the desired average fill level can be set by a register.

The fill level control apparatus 1 according to the first aspect of the present disclosure is configured to control the average fill level of the asynchronous first-in-first-out FIFO 2. The fill level control apparatus 1 does hitlessly control the average fill level of the asynchronous FIFO by controlling its empty rate clock. If the average fill level of the FIFO 2 is above the desired operating point, the empty rate clock is temporarily slightly increased in order to move the average fill level back to its desired set value. If the average fill level of the FIFO 2 is below the desired operating point, the empty rate clock is temporarily slightly decreased in order to move the average fill level of the FIFO 2 back to the desired set value. If a temporary change in the empty rate clock is gradual and small enough, not only will no data errors be taken, but violations of jitter and wander can also be avoided. Wander violations are avoided once the FIFO's desired operating point is initially reached. This generally takes place when the data path is initially provisioned or recovers from a traffic disruption. Once that is achieved, the continuous adjustments are small enough to remain within wander specifications. The advantage of controlling the FIFO 2 in this way is that it continuously ensures a constant latency and accomplishing this without taking any data errors.

The first main purpose of the fill level control apparatus 1 according to the first aspect of the present disclosure is to hold an asynchronous FIFO center operating point constant thus ensuring that the FIFO 2 is not a source of latency variation in an electronic circuit. The second main purpose of the fill level control apparatus 1 according to the first aspect of the present disclosure is to ensure that jitter or wander on either the fill rate or the empty rate does not cause the FIFO 2 to overrun or underrun. That is, if the center operating point of the FIFO 2 is too close to the full or empty level, as its instantaneous fill level moves up and down due to a bursty fill rate, the FIFO 2 can be subject to an overrun or underrun if either a clock signal experiences enough jitter or wander to push the fill level of the FIFO 2 above full or below empty. In that event, data errors will occur. The advantage of controlling the FIFO 2 by the fill level control apparatus 1 is that it continuously ensures a constant latency and does accomplish this constant latency without that data errors are generated.

By hitlessly controlling the FIFO's center operating point, the FIFO's contribution to overall latency within a signal path remains constant.

In a possible embodiment of the fill level control apparatus 1, the offset calculation unit 3 can comprise several subcomponents. In a possible embodiment, the offset calculation unit 3 comprises a programmable target center operating point register adapted to or configured to store the target average fill level of the FIFO 2, a fill level averaging circuit adapted to or configured to compute the current average fill level on the basis of monitored fill levels of the FIFO 2 and a subtractor 3C (FIG. 2) adapted to or configured to subtract the computed current average fill level from the stored target average fill level to calculate the offset between the target average fill level and the current average fill level of the FIFO 2.

Figure 2:
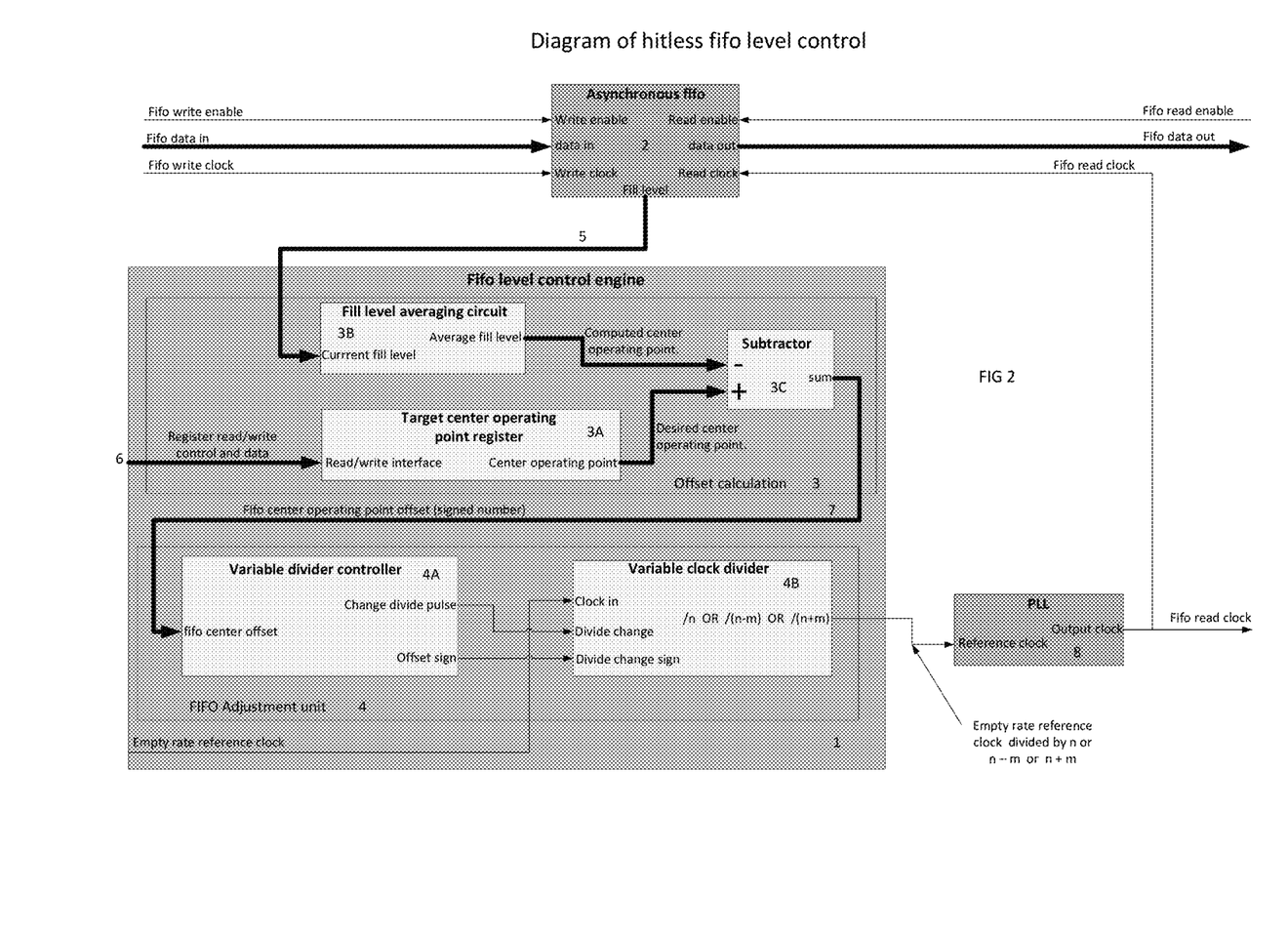
FIG. 2 shows a block diagram of a further possible exemplary embodiment of a fill level control apparatus according to the first aspect of the present disclosure.

In a further possible embodiment, also the adjustment unit 4 of the fill level control apparatus 1 as shown in FIG. 2 can comprise several subcomponents. In a possible embodiment, the adjustment unit 4 as shown in FIG. 2 comprises a variable divider controller 4A and a variable clock divider 4B.

FIG. 2 shows a possible exemplary embodiment of a fill level control apparatus 1 according to the first aspect of the present disclosure. The fill level control apparatus 1 forms a FIFO level control engine for an asynchronous FIFO 2 as shown in FIG. 2. The asynchronous FIFO 2 comprises inputs and outputs. The inputs of the FIFO 2 comprise a FIFO read enable and a FIFO read clock. These two control signals are adapted to or configured to control an empty rate of the FIFO 2. The empty rate of the FIFO 2 is given by a read clock frequency multiplied with read enable duty cycle. Further control inputs of the FIFO 2 comprise a FIFO write enable and a FIFO write clock as shown in FIG. 2. These two control signals are adapted to or configured to control a fill rate of the FIFO 2. The fill rate of the FIFO 2 is given by the write clock frequency multiplied with the write enable duty cycle.

Further, the FIFO 2 comprises in the illustrated embodiment of FIG. 2 FIFO data in for receiving input data from a data source. Further, the FIFO 2 comprises as an output a FIFO data output to supply FIFO data to a data sink. In the illustrated embodiment of FIG. 2, the asynchronous FIFO 2 comprises four control inputs, one data input and one data output. The asynchronous FIFO 2 further comprises an instantaneous fill level output connected via a signal line 5 to an input of the fill level control apparatus 1 as shown in FIG. 2. In the illustrated embodiment of FIG. 2, the fill level control apparatus 1 comprises an offset calculation unit 3 and an adjustment unit 4. The offset calculation unit 3 comprises in the illustrated embodiment a programmable target center operating point register 3A, a fill level averaging circuit 3B and a subtractor 3C. The programmable target center operating point register 3A is adapted to or configured to store a target average fill level of the FIFO 2. The register holds the target FIFO center operating point. The target center operating point register 3A can in a possible implementation be programmed by a microprocessor through an interface of the fill level control apparatus 1. The illustrated implementation of FIG. 2 of the target center operating point register 3A receives the desired target average fill level of the FIFO 2 through an interface line 6. The target center operating point register 3A stores the received desired center operating point of the FIFO 2.

The offset calculation unit 3 further comprises the fill level averaging circuit 3B. The fill level averaging circuit 3B is adapted to or configured to compute a current average fill level on the basis of monitored fill levels received from the FIFO 2 through signal line 5.

Further, the offset calculation unit 3 comprises a subtractor 3C connected to the programmable target center operating point register 3A and to the fill level averaging circuit 3B as shown in FIG. 2. The subtractor 3C of the offset calculation unit 3 is adapted to or configured to subtract the computed current average fill level from the stored target average fill level to calculate the offset between the target average fill level and the current average fill level of the FIFO 2. This calculated offset is supplied via a signal line 7 internally to the adjustment unit 4 as shown in FIG. 2.

In the embodiment of FIG. 2, the adjustment unit 4 comprises two subcomponents or subunits. The first subunit of the adjustment unit 4 is a variable divider controller 4A receiving the calculated offset value from the subtractor 3C via the internal signal line 7 of the fill level control apparatus 1. The adjustment unit 4 further comprises in the illustrated embodiment a variable clock divider 4B. The variable divider controller 4A of the adjustment unit 4 is adapted to or configured to determine a number x of divide change pulses required to compensate the offset calculated by the offset calculation unit 3 and to generate a corresponding number x of divide change pulses supplied to the variable clock divider 4B of the adjustment unit 4. The variable clock divider 4B of the adjustment unit 4 is adapted to or configured to divide a received empty rate reference clock supplied to the fill level control apparatus 1 as shown in FIG. 2 depending on the divide change pulses received from the variable divider controller 4A of the adjustment unit 4 to adjust continuously the empty rate clock driving the empty rate of the FIFO 2. The variable divider controller 4A of the adjustment unit 4 is further adapted to or configured to pass an offset sign of the offset calculated by the offset calculation unit 3 to the variable clock divider 4B of the adjustment unit 4 as also shown in FIG. 2. The variable clock divider 4B of the adjustment unit 4 receiving the offset sign of the offset from the variable divider controller 4A is adapted to or configured to divide the received empty rate reference clock depending on the received offset sign and depending on a number x of divide change pulses received from the variable divider controller 4A.

The offset calculation unit 3 comprises in the illustrated embodiment of FIG. 2 a fill level averaging circuit 3B. In the illustrated embodiment, the instantaneous FIFO fill level of the FIFO 2 is supplied via the signal line 5 to the fill level averaging circuit 3B which is adapted to or configured to compute the center operating point of the FIFO 2. The instantaneous FIFO fill level of the FIFO 2 may vary but since the fill rate and the empty rate are the same there is a center operating point, i.e. average FIFO level. The FIFO fill averaging circuit 3B is adapted to or configured to determine a current center operating point of the FIFO 2 after evaluating a number or plurality of FIFO fill level values received from the FIFO 2 via line 5. The FIFO fill level averaging circuit 3B is adapted to or configured to monitor the fill level through a number of FIFO cycles from its minimum fill level to its maximum fill level and back to its minimum fill level. In a possible embodiment, the minimum and maximum FIFO fill levels can be recorded and added to a sum k times. In a possible embodiment, the center operating point is determined to be [sum/(k*2)]. Generally, the k number of minimum and maximum values which do contribute to the calculated sum is a power of 2. In this embodiment, the division can be implemented by a shift operation. The larger the value of k, the more accurate is the computed FIFO center operating point output by the fill level averaging circuit 3B.

Once the current center operating point is determined by the fill level averaging circuit 3B and passed onto the subtractor 3C, the fill level averaging circuit 3B can pause until a period of time after the variable divider controller 4A has finished issuing the last divide change pulse to the variable clock divider 4B. This pause period allows a PLL circuit 8 shown in FIG. 2 to respond to the changes in it's reference clock and alter the FIFO's center operating point. Once the center operating point is again stable, the circuit can resume sampling FIFO fill levels in order to compute the average fill level again. This loop process is continuous.

The FIFO 2 shown in FIG. 2 that is monitored by the fill level control apparatus 1 has in a preferred embodiment the ability to continuously update its fill level. It is not necessary that the FIFO fill level update is performed on every read or write clock edge. As the two clock signals are asynchronous, updating on every read clock edge or write clock edge can be impractical. It is necessary that a continuous update process be engaged in the FIFO 2 in order to update the fill level output as frequently as possible. The averaging process does filter out the non-continuous nature of the FIFO fill level updates.

As an additional feature, the fill level control apparatus 1 can be designed to minimize a jitter and wander once the FIFO's average depth reaches the desired value. The circuit which controls the FIFO level adjustments can be programmed such that if the measured average fill level offset is less than or equal to a programmed threshold (which can be generally set to 1), then before any further adjustments are made, the measured fill level offset must be consistent for a programmed number of iterations. This prevents an adjustment of the fill level back and forth which can cause an unnecessary jitter and wander. By requiring consistency in small threshold offset measurements, this generally results in no further adjustments once the center operating point of the FIFO 2 reaches the programmed value.

EXAMPLE

The required number of consecutive offsets within the set threshold is set to 5. The threshold is set to 1. If the offset determined by the fill level averaging circuit 3B is 1, 1, 1, 1, 1, an adjustment of 1 location would be made. If the offset determined by the fill level averaging circuit 3B is −1, −1, −1, −1, −1, an adjustment of 1 location would be made. If the offset determined by the fill level averaging circuit 3B is however 1, 1, 1, 1, 0, no adjustment is made. If the offset determined by the fill level averaging circuit 3B is −1, −1, −1, −1, 0, no adjustment is made. If the offset determined by the averaging circuit 3B is 1, 1, 1, 1, −1, no adjustment is made. If the offset determined by the averaging circuit 3B is 1, 0, −1, 1, 0, no adjustment is made. If the offset determined by the averaging circuit 3B is 1, 2, x, x, x, then an adjustment of 2 would be made as soon as the offset of 2 is detected since the threshold for requiring a consistent number of the same offsets (+1 or −1 in this example) is exceeded.

The offset calculation unit 3 comprises a target center operating point register 3A as shown in the embodiment of FIG. 2. The target center operating point register 3A can be programmed with a desired FIFO center operating point. The target FIFO average fill level is programmable and its value is somewhat arbitrary, i.e. is a choice of a user. The average depth of the FIFO 2 is proportional to the latency through the FIFO 2. For any application where the value of the FIFO's latency is an issue, i.e. a minimum signal latency is desired, a user would want to set the center operating point of the FIFO 2 to a lowest possible value while ensuring that as the FIFO's instantaneous level swings above and below this average value, the FIFO 2 does not underflow. Thus, the user has to first determine the total swing in FIFO depth due to changes in its fill or empty rate. Once the total swing in the FIFO depth is determined, the user can set the center operating point high enough to where the FIFO 2 does not underflow and still does achieve the desirable throughput latency. A user can set the center operating point of the FIFO 2 at any level so long as instantaneous swings in the fill/empty rate do not cause an overflow or underflow of the FIFO 2.

EXAMPLE

If the FIFO 2 has a physical depth of 0x100 locations, due to changes in the fill rate, the FIFO depth is expected to swing by +−0x20 locations. The desired latency is less than 0x40 clock periods. In this example, a user can set the center operating point to 0x28. Since the fill level of the FIFO 2 is expected to vary by +−0x20 (from the center point), once the algorithm has adjusted the FIFO fill level, the FIFO fill level does swing between 0x08 and 0x48. The 8 additional locations from empty are there to provide a margin.

The offset calculation unit 3 of the fill level control apparatus 1 comprises in the illustrated embodiment of FIG. 2 further a subtractor 3C. The computed FIFO center operating point and the desired center FIFO operating point are supplied to the subtractor 3C as shown in FIG. 2. The FIFO center operating point is computed by the fill level averaging circuit 3B. The desired center FIFO operating point is supplied from the target center operating point register 3A. If the computed FIFO center operating point is greater than the desired (target) FIFO center operating point, then the value output by the subtractor 3C is a negative number. If the computed FIFO center operating point is less than the desired (target) FIFO center operating point, the calculated value output by the subtractor 3C is a positive number. The number represents the offset between the target (desired) center FIFO fill level and the computed FIFO center level. The computed value is supplied via signal line 7 to the variable divider controller 4A of the adjustment unit 4.

The variable divider controller 4A of the adjustment unit 4 receives the offset between the target FIFO center level and the computed FIFO center level from the subtractor 3C as shown in FIG. 2. The variable divider controller 4A determines how many (n+m) or (n−m) divides are required in order to move the FIFO center operating point to the target value. The variable divider controller 4A is adapted to or configured to generate pulses to the variable clock divider 4B on its divide change input. Each pulse does initiate a one time change in the nominal divide value of n to either (n+m) or (n−m). The variable divider controller 4A further does pass the offset sign (positive or negative) of the offset to the variable clock divider 4B. The offset sign determines whether or not the one time change in the divide value is (n−m) or (n+m). A negative offset sign does cause the change in the divide to be (n−m). A positive sign does cause the change in the divide to be (n+m). Each pulse generated causes the variable clock divider 4B to divide by (n+m) or (n−m) depending on the offset sign one time. After the one time divide of (n+m) or (n−m), the variable clock divider 4B resumes dividing by n. The pulses can be spaced out in time so that excessive jitter is not generated. The jitter generated is also a function of the PLL's loop bandwidth and thus, the PLL is chosen in a preferred embodiment such that jitter violations are avoided.

The variable clock divider 4B divides the empty rate reference clock by a number n or n+m or n−m (sign-dependent). Generally, m can be set to 1 but it is possible that m is variable. The number of n+m or n−m divides depends on the difference between the target average FIFO fill level and the computed average FIFO fill level as well as the multiplication factor between the divided empty rate reference clock and the final empty rate clock driving the read state of the FIFO 2. The number of divide change pulses is x. Accordingly, the variable divider controller 4A can compute the required number x of n+m or n−m divides to be performed by the variable clock divider 4B in order to move the average FIFO fill level of the FIFO 2 to the target value.

The variable clock divider 4B nominally divides the received empty rate reference clock by n. Upon reception of each divide change pulse, the variable clock divider 4B can divide the received empty rate reference clock supplied to the fill level control apparatus 1 by either n+m or n−m (sign-dependent) once. For each computation of the average FIFO fill level offset, x divide change pulses are issued to the variable clock divider 4B. If the computed average FIFO fill level is equal to the target average FIFO fill level then x=0. The divided empty rate reference clock forms a timing source for the empty rate of the FIFO 2.

The offset sign generated by the variable divider controller 4A indicates whether or not the computed average FIFO fill level is above the target average FIFO fill level or below the target average FIFO fill level. The variable clock divider 4B receiving the offset sign of the offset from the variable divider controller 4A is adapted to or configured to divide the received empty rate reference clock depending on the received offset sign and depending on a number x of divide change pulses received from the variable divider controller 4A. If the computed average FIFO fill level is above the target fill level, then the offset sign does indicate that the variable clock divider 4B shall divide by n−m for each divide change pulse received thus briefly raising the FIFO empty rate which does drive the average FIFO fill level down. If the computed average FIFO fill level is below the target fill level, then the offset sign does indicate that the variable clock divider 4B shall divide by n+m for each divide change pulse received thus briefly lowering the FIFO empty rate which does drive the average FIFO fill level up.

The variable clock divider 4B of the adjustment unit 4 is adapted to or configured to divide the received empty rate reference clock by a nominal divide value n in the absence of any divide change pulse and is further adapted to or configured to divide the received empty rate reference clock by n+m one time upon reception of each divide change pulse if the received offset sign is positive and is further adapted to or configured to divide the received empty rate reference clock by n−m one time upon reception of each divide change pulse if the received offset sign is negative.

A typical value for m can be 1. The lower the number m the less jitter is generated. The variable clock divider 4B does divide the reference clock by n+m or n−m (depending on the received offset sign) once each time that a divide change pulse is received. The divide change pulses can be spaced out in time in order to reduce the generated jitter. The amount of time between each divide change pulse is programmable and resides in a register similar to the target average fill level register. Once the computed number x of divide change pulses is issued, the adjustment algorithm can wait in a possible embodiment for a period of time prior to measuring the new average FIFO fill level. This period of time can also be programmable. It is possible to allow the external PLL 8 to phase-lock to the changes in divide values previously performed by the variable clock divider 4B.

Once a correct number of change divide pulses are generated, the controller can pause for enough time to allow the PLL 8 to respond to the changes in its reference clock and alter the FIFO center operating point. Once that time has passed, the fill level averaging circuit 3B can resume sampling the FIFO fill level for the purpose of computing the center operating point of the FIFO 2. Once the FIFO center operating point has been computed, the offset is once again computed and passed to the variable divider controller module 4A. The module then repeats the process of distributing change divide pulses to the variable clock divider 4B. This looped process can be continuous. If the offset is 0, then no change divide pulses are generated. In general, once the offset is 0, it does remain 0 unless a timing disruption occurs on the empty rate reference clock or the FIFO write clock.

The computation of the required number of divide change pulses can be design-dependent.

EXAMPLE

The empty rate reference clock is 155.52 MHz. The FIFO write clock is 167.3316 MHz. The FIFO write enable duty cycle is 0.9294. Thus, the FIFO fill rate is 155.52 MHz. The value of n and m in the variable clock divider 4B is 4 and 1, respectively. The PLL 8 multiplies by 4. The PLL 8 shown in the embodiment of FIG. 2 can be adapted to or configured to multiply by 1. Thus, the FIFO empty rate of the FIFO 2 is 155.52 MHz. When the variable clock divider 4B introduces a divide by 3 or a divide by 5, the FIFO read clock of the FIFO 2 is adjusted for a phase change equal to 1 period of 155.52 MHz since the empty rate reference clock is 155.52 MHz. Thus, this adjustment is equal to accumulating one FIFO location in either a positive or negative direction. Thus, in this example, if the offset between the desired average fill level and the computed average fill level is 10 locations, then the variable divider controller 4A has issued 10 change divide pulses. Other embodiments may have different factors between the fill and empty rate and the empty rate reference clock. The possible choice of n and m in the variable clock divider 4B does also affect how the number of change divide pulses are computed for a given average FIFO fill offset. The goal is to compute the number of change divide pulses such that once the computed number of change divide pulses are sent to the variable clock divider 4B, the average FIFO fill offset is as close to 0 as possible.

In the absence of any divide change pulse applied to the divide change input, the variable clock divider 4B divides its received clock by n. Once an offset has been determined and passed to the variable divider controller 4A, the controller issues divide change pulses to the variable clock divider 4B.

If the average FIFO fill level offset is a positive number, then the FIFO center operating point is less than the desired (target) FIFO center operating point. In this case, when a divide change pulse does occur, the variable clock divider 4B divides its clock in by n+m. The result is a brief reduction in the PLL's reference clock frequency which does result in a brief reduction in the empty rate of the FIFO 2 allowing a center operating level to increase. Stated another way, each one time clock divide of (n+m) does represent a phase shift in the PLL's reference clock. The PLL does correspondingly adjust its output frequency to compensate for this phase shift thus raising the FIFO's center operating point.

If the average FIFO fill offset is a negative number, then the FIFO's center operating point is greater than the desired (target) FIFO center operating point. In this case, when a divide change pulse occurs, this circuit divides the clock in by (n−m). The result is a brief increase in the PLL's reference clock frequency which results in a brief increase in the empty rate of the FIFO allowing its center operating level to decrease. Stated another way, each one time clock divide of (n−m) does represent a phase shift in the PLL's reference clock. The PLL does correspondingly adjust its output frequency to compensate for this phase shift thus lowering the FIFO's center operating point. Possible values for n and m are 4 and 1, respectively. In a possible embodiment, the circuit does nominally divide by 4. When divide change pulses are input, the variable clock divider 4B can divide by 3 or 5 (depending on the divide change sign) one time and then resuming dividing by 4.

As shown in FIG. 2, the empty rate reference clock divided by the variable clock divider 4B of the adjustment unit 4 is supplied as a reference clock to the phase-locked loop, PLL, circuit 8 providing a PLL output clock adapted to or configured to control the empty rate clock driving the empty rate of the FIFO 2. The output clock of the PLL circuit 8 forms the FIFO read clock source.

The empty rate reference clock supplied to the fill level control apparatus 1 drives the variable clock divider 4B, the output of which is a reference clock that drives the PLL circuit 8 and alternately source the FIFO read clock frequency.

Figure 3:
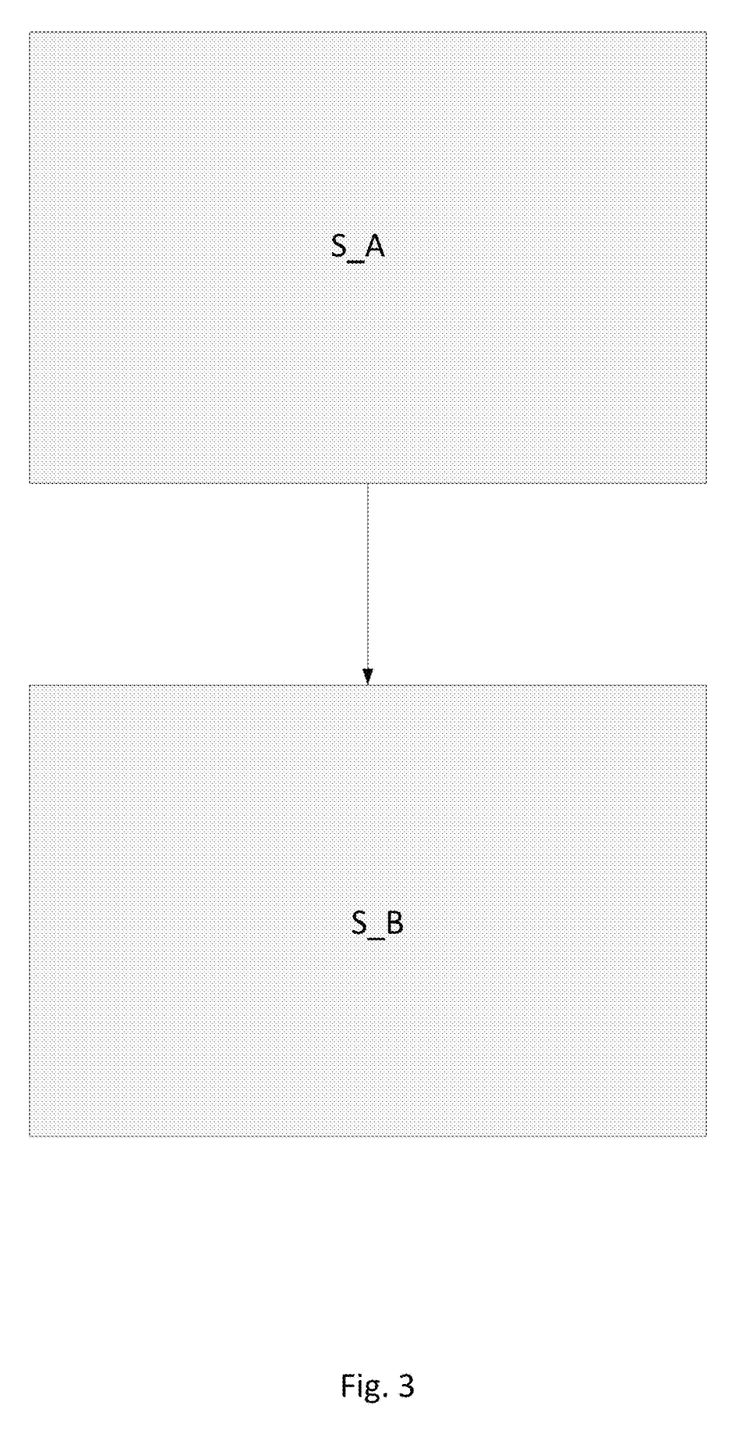
FIG. 3 shows a flowchart of a possible exemplary embodiment of a method for controlling an average fill level of an asynchronous first in first out, FIFO, according to a further aspect of the present disclosure.

FIG. 3 shows a flowchart of a possible exemplary embodiment of a method for controlling an average fill level of an asynchronous first-in-first-out FIFO according to an aspect of the present disclosure.

In the illustrated exemplary embodiment, the method comprises two main steps $S_A$, $S_B$. In a first step $S_A$, the offset between a target average fill level and the current average fill level of a FIFO is calculated.

In a second step $S_B$, the empty rate of the FIFO is adjusted continuously in response to the calculated offset to keep the average fill level of the FIFO constant.

In a possible embodiment of the method as illustrated in FIG. 3, instantaneous fill levels of an asynchronous FIFO 2 can be monitored to determine the current average fill level of the FIFO used for calculating the offset between the target average fill level and the current average fill level of the FIFO in step $S_A$.

Figure 4:
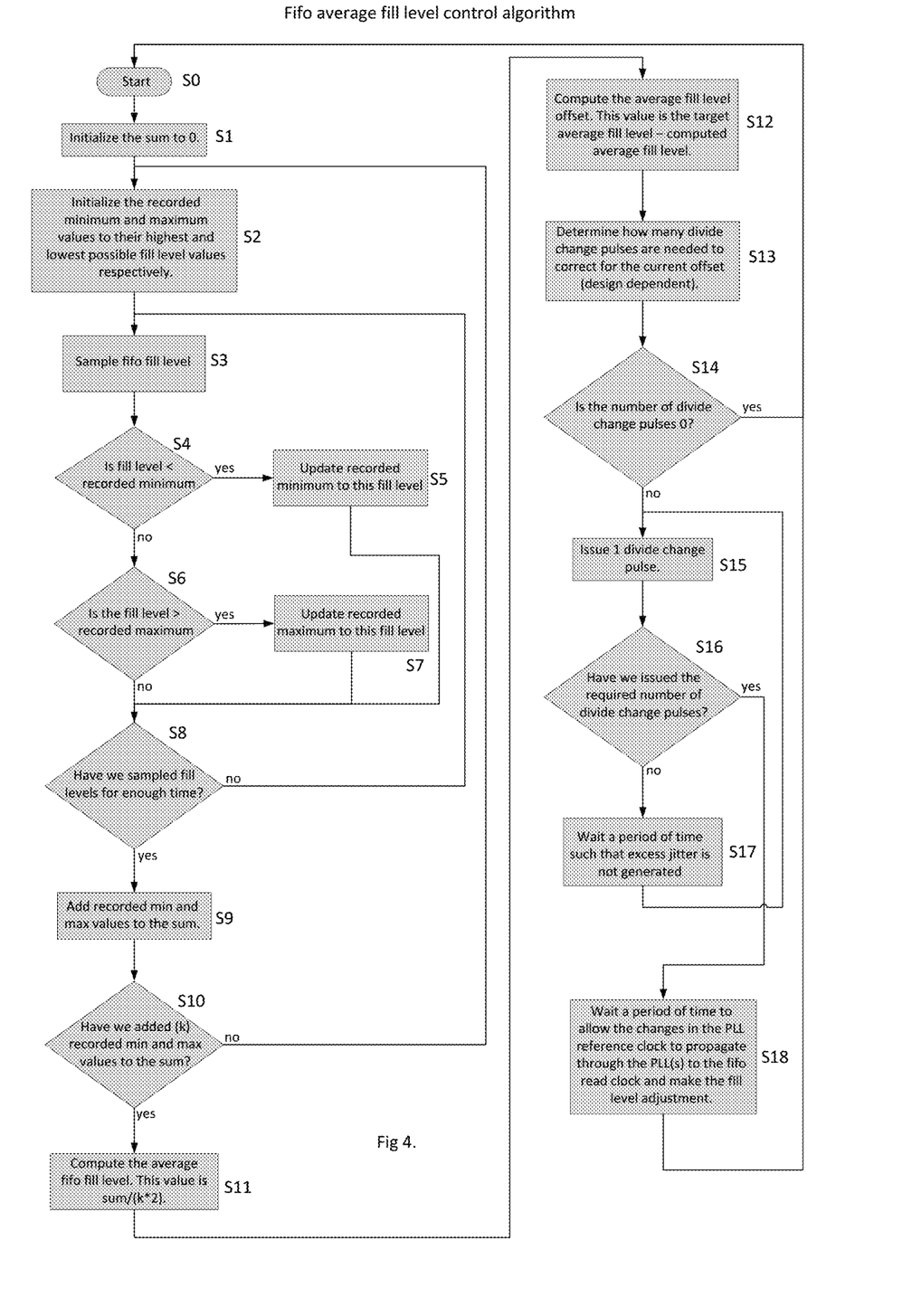
FIG. 4 shows a more detailed flowchart of a possible exemplary embodiment of a method according to an aspect of the present disclosure.

FIG. 4 shows a flowchart of a possible exemplary specific embodiment of a FIFO average fill level control algorithm according to a possible implementation of the method as illustrated in FIG. 3.

After a start step S0, a sum output by the subtractor 3C of the offset calculation unit 3 can be initialized to 0 in step S1.

In a further step S2, the recorded minimum and maximum values can be initialized to their highest and lowest possible fill level values, respectively.

In a further step S3, the FIFO fill level of the controlled FIFO 2 can be sampled. In a further step S4, it is checked whether the fill level is lower than a recorded minimum. If the FIFO level of the monitored FIFO 2 is less than the recorded minimum value, the recorded minimum is updated to this current fill level in step S5.

In a further step S6, it is checked whether the current fill level of the FIFO 2 is higher than a recorded maximum value. If the current fill level exceeds the recorded maximum value, the recorded maximum value is updated in step S7 to this current fill level.

In a further step S8, it can be checked whether the fill levels of the FIFO 2 have been sampled for a long enough time. If the sampled fill levels have not been sampled long enough the process returns to step S3 as illustrated in FIG. 4.

In a further step S9, the recorded minimum and maximum values are added to the sum initialized in step S1.

In a further step S10, it is checked whether k recorded minimum and maximum values have been added to this sum. If this is not the case then the process returns to step S2 as illustrated in the flowchart of FIG. 4.

In a further step S11, an average FIFO fill level can be computed. In a possible implementation, this value is computed as sum/(k*2). In general, the number k of recorded min and max fifo fill levels will be a power of 2. This makes the divide by (k*2) a simple shift.

In a further step S12, the average fill level offset is computed. This value is the target average fill level minus the computed average fill level.

In step S13, it is determined how many divide change pulses are needed to correct the current offset (design-dependent).

In a further step S14, it is checked whether the number of divide change pulses is 0. If the number of divide change pulses is 0 the process returns to step S0 as illustrated in the flowchart of FIG. 4. In contrast, if the number of divide change pulses is not 0, one divide change pulse is issued in step S15 as shown in FIG. 4.

In a further step S16, it is checked whether the required number of divide change pulses has been issued or not. If the required number of divide change pulses has not been issued the process waits in step S17 for a period of time such that excess jitter is not generated. Then, the process continues with step S15 as illustrated in the flowchart of FIG. 4. If in step S16 it has been found that the required number of divide change pulses has been issued the process continues with step S18 as shown in FIG. 4. In step S18, the process waits a period of time to allow the changes in the PLL reference clock to propagate through the PLL to the FIFO read clock and to make the fill level adjustment. Then, the control process illustrated in FIG. 4 returns to step S0. The average FIFO fill level control algorithm illustrated in the exemplary embodiment of FIG. 4 can be implemented in a fill level control apparatus 1 as shown in FIG. 1 configured to control the average fill level of an asynchronous first-in-first-out FIFO 2. The fill level control apparatus 1 provides a hitless FIFO level control. Consequently, the FIFO's contribution to overall latency is kept constant. Further, data errors due to jitter or wander on the fill or empty rate clock are avoided.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fill level control apparatus configured to control an average fill level of an asynchronous first-in-first-out (FIFO) the fill level control apparatus comprising:
    an offset calculation unit adapted to calculate an offset between a programmable target average fill level and a current average fill level of the FIFO; and
    an adjustment unit adapted to adjust an empty rate of the FIFO in response to the calculated offset to keep the average fill level of the FIFO constant;
    wherein the adjustment unit only adjusts the empty rate if the calculated offset is consistently non-zero and consistently either positive or negative for a programmed number of iterations when the calculated offset consistently is equal to or below a predetermined threshold;
    wherein the offset calculation unit comprises a fill level average circuit configured to compute a center operating point of the FIFO;
    wherein the adjustment unit comprises a variable divider controller configured to determine a number of divide change pulses required to compensate the offset calculated by the offset calculation unit and to generate a corresponding number of divide change pulses supplied to a variable clock divider of the adjustment unit; and
    wherein the fill level averaging circuit is configured to pause when the current center operating point is determined by the fill level averaging circuit until a period of time after the variable divider controller has finished issuing the last divide change pulse to the variable clock driver.

2. The fill level control apparatus according to claim 1 wherein the offset calculation unit comprises:
    a programmable target center operating point register adapted to store the target average fill level of the FIFO; and
    a subtractor adapted to subtract the computed current average fill level from the stored target average fill level to calculate the offset between the target average fill level and the current average fill level of the FIFO;
    wherein the fill level averaging circuit is configured to compute the current average fill level on the basis of monitored fill levels of the FIFO.

3. The fill level control apparatus according to claim 1 wherein the variable clock divider of the adjustment unit is adapted to divide a received empty rate reference clock depending on the divide change pulses received from the variable divider controller of the adjustment unit to adjust the empty rate clock driving the empty rate of the FIFO.

4. The fill level control apparatus according to claim 1 wherein the variable divider controller of the adjustment unit is adapted to pass an offset sign of the offset calculated by the offset calculation unit to the variable clock divider of the adjustment unit.

5. The fill level control apparatus according to claim 4 wherein the variable clock divider receiving the offset sign of the offset from the variable divider controller is adapted to divide the received empty rate reference clock depending on the received offset sign and depending on a number of divide change pulses received from the variable divider controller.

6. The fill level control apparatus according to claim 5 wherein the variable clock divider of the adjustment unit is adapted to divide the received empty rate reference clock by a nominal divide value, n, in an absence of any divide change pulse and is further adapted to divide the received empty rate reference clock by n+m one time upon reception of each divide change pulse if the received offset sign is positive and is further configured to divide the received empty rate reference clock by n−m one time upon reception of each divide change pulse if the received offset sign is negative.

7. The fill level control apparatus according to claim 5 wherein the empty rate reference clock divided by the variable clock divider of the adjustment unit is supplied as a reference clock to a phase-locked loop, PLL, circuit providing a PLL output clock adapted to control the empty rate clock driving the empty rate of the FIFO.

8. The fill level control apparatus according to claim 1 wherein the empty rate of the FIFO is equivalent to an empty rate clock frequency of an empty rate clock multiplied with a read enable duty cycle.

9. The fill level control apparatus according to claim 2 wherein the FIFO controlled by the fill level control apparatus comprises a fill level output indicating instantaneous fill levels of the FIFO connected to the fill level averaging circuit of the offset calculation unit of the fill level control apparatus.

10. The fill level control apparatus according to claim 9 wherein the fill level averaging circuit of the offset calculation unit is adapted to monitor the fill levels indicated by the FIFO through a number of FIFO cycles to record minimum and maximum FIFO fill levels and to compute the current average fill level of the FIFO depending on recorded minimum and maximum FIFO fill levels.

11. The fill level control apparatus according to claim 2 wherein the target center operating point register of the offset calculation unit is programmed by a microprocessor through an interface of the fill level control apparatus.

12. A method for controlling an average fill level of an asynchronous first-in-first-out, FIFO, comprising:
    calculating an offset between a target average fill level and a current average fill level of the FIFO;
    adjusting an empty rate of the FIFO in response to the calculated offset to keep the average fill level of the FIFO constant;
    computing a center operating point of the FIFO;

determining a number of divide change pulses required to compensate the calculated offset and generating a corresponding number of divide change pulses supplied to a variable clock divider; and pausing the computing of the center operating point when the current center operating point is determined until a period of time after finishing issuing the last divide change pulse to the variable clock divider;

wherein the empty rate is only adjusted if the calculated offset is either above a predetermined threshold or consistently non-zero and consistently either positive or negative for a programmed number of iterations when the calculated offset consistently is equal to or below a predetermined threshold.

13. The method according to claim 12 wherein instantaneous fill levels of the FIFO are monitored to determine the current average fill level of the FIFO.

\* \* \* \* \*